May 19, 1942.   H. B. PORTER   2,283,226
METHOD AND MEANS FOR DEFINING CONTOURS FROM STEREOSCOPIC PHOTOGRAPHS
Filed March 19, 1941
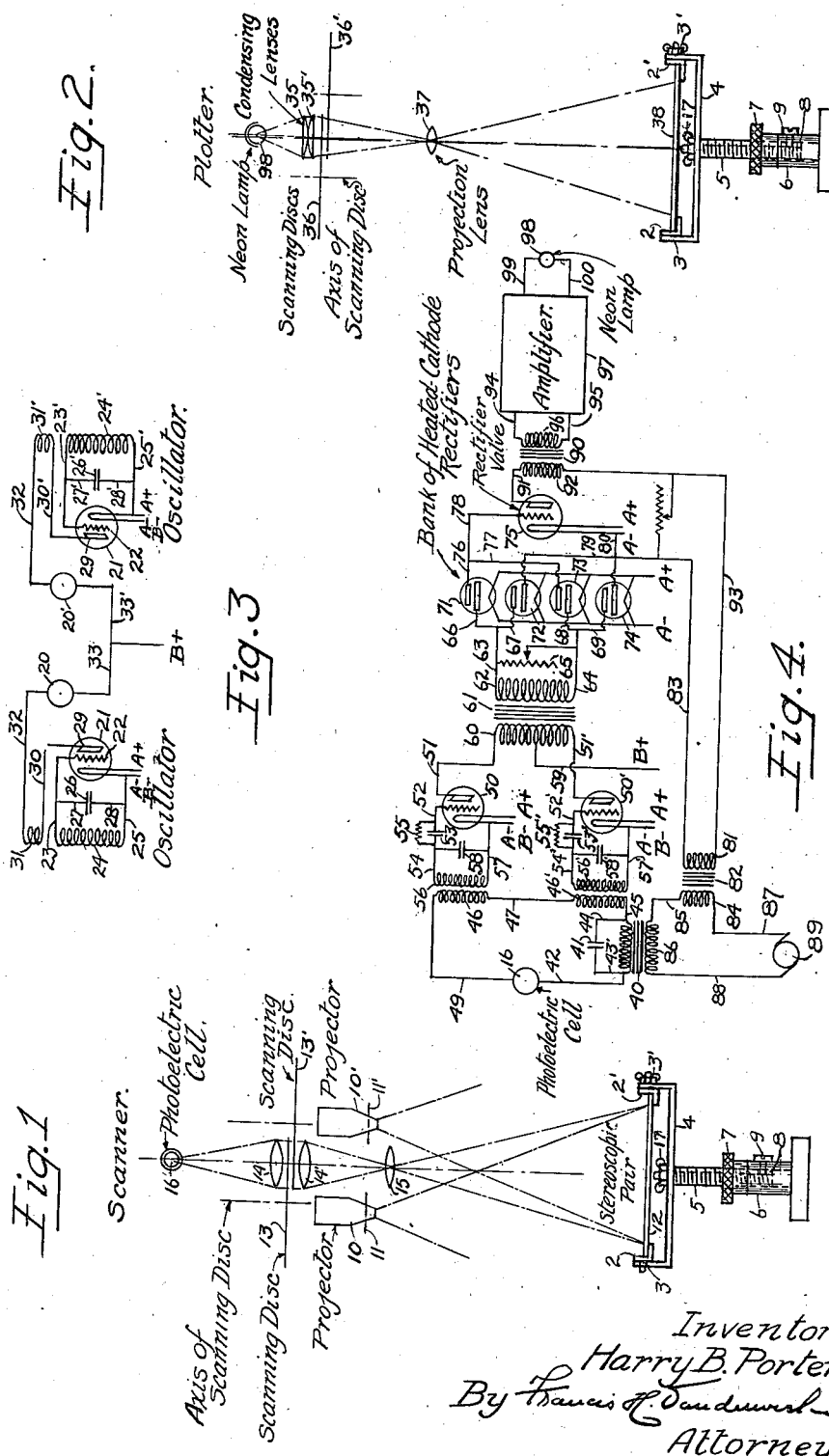
Inventor
Harry B. Porter
By Francis H. Vandewrh
Attorney Patented May 19, 1942

2,283,226

UNITED STATES PATENT OFFICE 2,283,226

METHOD AND MEANS FOR DEFINING CONTOURS FROM STEREOSCOPIC PHOTOGRAPHS

Harry B. Porter, Huntington, W. Va.

Application March 19, 1941, Serial No. 384,071

8 Claims. (Cl. 178—6.5)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to stereoscopic plotting apparatus, but more particularly to a method and means for contouring aerial maps by means of a device designated herein as an autoplastograph, since it automatically scans stereoscopic photographs and plots the contours represented thereon at various elevations.

One object of the invention is to provide an apparatus of the class described, the accuracy of which is limited only by the accuracy of the photographs used, owing to the complete elimination of personal errors.

Another object of the invention is to provide a device of the class described in which the contours at various elevations are outlined by merely tracing or otherwise recording contours already automatically "picked out" or selected by the machine.

Another object of the invention is to provide a device of the class described which compensates for difference in horizontal scale due to difference in ground elevation.

Another object of the invention is to provide a device of this type in which no special ocular training is required for the operation thereof, stereoscopic vision being unnecessary.

Still another object of the invention is to provide a device for outlining contours at various elevations which is simple to operate, and is easy on the eyes of the operator.

With these and other objects in view this invention relates to certain novel details of construction, combination and arrangement of parts to be more fully herein described and claimed.

Referring to the figures in which like parts are designated by similar reference characters:

Fig. 1 is a diagrammatic view of the scanner, showing means for projecting a stereoscopic pair of photographs upon an adjustable screen, and an optical system including scanning discs for focusing various points of the stereoscopic pair upon a photoelectric cell;

Fig. 2 is a diagrammatic view of the plotter, showing the optical system, including scanning discs, neon lamp, and lenses, for projecting the resultant contour for a given elevation upon an adjustable screen.

Fig. 3 is a diagrammatic view showing the oscillator circuits controlling the fluctuation of the projector lamps in the scanner, and Fig. 4 is a diagrammatic view of the analyzer, showing the electrical apparatus adapted to analyze the electrical impulses set up by the photoelectric cell of the scanner and transmit the information, in the form of properly timed electrical impulses, to the plotter.

In order that the construction and operation of the autoplastograph may be more readily understood, a brief description of the camera plastica will first be given as this latter device is somewhat analogous.

The camera plastica

In the operation of the camera plastica two positives, forming a stereoscopic pair, are projected simultaneously in coincidence on a drawing-board. Commonly one picture is projected through a glass screen colored red and the other through a green glass. A circular blind, of which one half sector is cut away, is made to rotate in front of the colored screens in such a manner that at one instant the red picture only is seen and at the next instant the green alone appears. If the photographs have been taken over hilly country from an airplane, the effect is to throw on the picture, viewed through hand-glasses, colored respectively red and green, what appears to be a model of the country in relief. If the rotation of the blind is slow one gains a curious impression, as if the picture were in process of moulding.

A draftsman may now sketch the country on the board, or a pantograph may be used to transfer the picture to a drawing nearby. The plastic effect of the combination of the two views enables the summit of a hill, for example, to be plotted in its true position; for, if the drawing-board is moved upwards by an amount which is the equivalent of the height of the hill, the summit of the latter becomes stationary and the moulding process, previously mentioned, ceases on the hilltop. The position of the hill cannot only be shown, but the amount of upward movement of the drawing-board is a measure of its height. This is so because it is only when the board is in this certain position that true stereoscopic coincidence of the two projected images of the hill takes place.

For a given position of the drawing-board, the stationary line previously mentioned is the line of points where the images are precisely coincident and therefore in focus. If a rotating blind is not used, reliance has to be placed on the estimation of correct focus alone. This is not so easy as it may appear; the positives have to be magnified, and magnification brings out the effect of engine vibration of the plates and the grain of the latter themselves. Even if the rotating blind is employed, movement in the vicinity of the stationary line is so minute that it is again difficult to draw the precise line of contour. Nevertheless, in spite of all the drawbacks mentioned, the method does provide an approximation to an accurately contoured topographical map.

The device which forms the subject matter of this invention makes use of the phenomenon of paralactic displacement. Although analogous to the camera plastica, its development is carried so far that it may be considered a radical departure from all other existing methods.

In order to clearly set forth the principles upon which the autoplastograph is constructed a general description will first be given before taking up the construction and operation in further detail.

*General description of principles of the autoplastograph*

If two positives forming a stereoscopic pair, are projected simultaneously in coincidence on a screen, one picture being projected through a glass filter colored red and the other through a green glass, the following will be true:

The horizontal positions of points which, on the ground, lie at an elevation corresponding to the position of the drawing board with respect to the two projectors, (points which are in correct focus), may be determined by noting whether the red and green colors are equal in intensity.

Choosing any single point on the screen, if either the red or the green predominates, one may be sure that the two projected positives do not coincide at the point on the screen in question, and therefore that the point is out of focus. If the green and red colors are of equal intensity, the point on the screen is in focus and represents the horizontal position of a point on the ground which lies at an elevation corresponding to the position of the screen with respect to the two projectors.

Now suppose that instead of projecting the two positives in red and green colored lights, that we project them both in the same color, but that the light used in projecting one positive is interrupted 60,000 times per second and that the light used to project the other positive is interrupted 100,000 times per second. Neither of the projected positives would appear to flicker to the human eye, but a photoelectric cell would be able to detect this high speed flickering. If a photoelectric cell were arranged in such a way that the light from a single point on the screen was allowed to act on it, the resistance of the photoelectric cell would vary in accordance with the fluctuations of the interrupted light mentioned above. The figures used above are for illustrative purposes only.

The amplitude of this variation in resistance for each of the two frequencies would be proportional to the intensities of the two positives at this particular point on the screen.

If the photoelectric cell were connected in such a way that its variation in resistance would be communicated to two resonant circuits, (one of which is tuned to 60,000 cycles per second and the other to 100,000 cycles per second), the two frequencies impressed upon the photoelectric cell would be separated so that in effect, the light from each projector could be made to react upon its corresponding tuned circuit. (This is very much like connecting two radio receivers to the same antenna and receiving two different broadcasting stations.)

The strength of the current in each tuned circuit would be proportional to the intensity of the light projected by its corresponding projector to the particular point on the screen, the light from which is reacting on the photoelectric cell. It would be a simple matter to balance the current strengths of the two circuits against each other to determine whether they are equal or unequal.

If these two current strengths are equal it means that the point on the screen is in focus and that it therefore represents the horizontal position of a point on the ground which corresponds in elevation to the position of the screen relative to that of the two projectors.

If the current strengths in the two circuits are unequal it means that the point on the screen is out of focus. If the point is in focus the current strengths are equal and this information may be communicated electrically to a plotting device.

The best means of selecting a single point on the screen for analysis in the above manner is by the use of scanning discs in connection with a suitable arrangement of lenses. The plotting may be done in a similar manner by an arrangement whereby a neon or other light will glow when the current strengths of the two resonant circuits are equal, and project a point of light through lenses and scanning discs onto a map sheet. The two sets of scanning discs must run in synchronism and the net result will be that all points which are in focus on the screen will be indicated in their true relative positions on the map sheet by a small point of light. These points of light, when connected together, will become a contour line.

One of the advantages of the autoplastograph will result from the high degree of sensitivity of the photoelectric cell to variations in light intensity. This eliminates the difficulty mentioned in connection with the camera plastica on this page, lines 2 to 5, first column, inclusive.

Assuming that point on the screen, the light from which is acting on the photoelectric cell, is out of focus, then the point of light consists of two different projected images superimposed. One image may be of a stone, and the other of a bunch of grass. In this case, the intensities of the light from the two images would be unequal. If the point on the screen under consideration is in focus, the point of light consists of two like projected images superimposed. Therefore the intensities of the light from the two images would be equal. Where an area presenting a perfectly uniform surface unbroken by differences in light reflected or by shadows of any kind, is being contoured, the intensities of the two images would be equal. This equality would exist whether the point on the screen, the light from which is acting on the photoelectric cell, is in focus or out of focus; hence, it would be impossible to determine any contours across this area. Such a condition as this, however, seldom occurs in nature, so it is considered to be of little or no importance. Any stereoscopic device is inoperative in a case of this kind.

The intensities of the neon lights in the two projectors should be regulated according to the "lightness" or "darkness" of the photographs. If one photograph was taken in bright sunlight and the other in diffused sunlight, the light used to project the latter should be of greater intensity than the light used to project the former, so that the two projected images on the screen will be of equal brilliance. The same result may be obtained by using projection lamps of equal intensity and having variable resistances connected in the plate circuits of the two amplifier-detector tubes for the purpose of compensating for the inequality of intensity or brilliance of the projected images. In this connection, it might be well to explain that I contemplate using image frequencies much higher than would permit of a visual detection of any flickering or "jumping" of the projected images. The reaction speed of a photoelectric cell can be taken roughly at 500,000 per second. The neon or other projection lamps for instance, the "Stroboglow" may be made to flicker at an extremely high rate, say about 100 kilocycles. The high frequencies would make it much easier to tune the two tuned circuits of the analyzer sharply. The two projection lamps will flicker at different frequencies.

*Description in detail*

Referring in detail to the structure of the autoplastograph, it will be noted that the device comprises a scanner, a plotter and an intermediate electrical apparatus known as the analyzer.

The scanner consists of two projectors 10 and 10' adjustable for tilt and altitude, for projecting a stereoscopic pair of photographs 11 and 11' and an adjustable screen 12 which can be moved toward or away from the projectors, a set of scanning discs 13 and 13', similar to those used in television, an optical system, comprising a pair of lenses 14 and 14' and a projection lens 15, for use with the scanning discs, and a photoelectric cell 16 placed behind the scanning discs for the purpose of converting the light impulses from the stereoscopic pair into electrical impulses.

The adjustable screens used with the scanner and plotter may be of identical construction as shown in Figs. 1 and 2. These screens 12 or 36 are mounted on trunnion brackets 2 and 2' which are fitted within bearings 3 and 3' in a yoke 4. The yoke 4 is rotatably mounted upon a reduced portion of a threaded shaft 5, said reduced portion being also threaded to accommodate a winged nut 17 which is provided to lock the screen in any desired position to which it is rotated.

The threaded shaft 5 is rotatably mounted within a base 6 and is provided with a knurled nut 7 for vertical adjustment thereof, and the shaft is also provided with a keyway 8 into which the end of a screw 9 fits to prevent the rotation thereof within the base 6.

This is just one form of construction by which the screen may be mounted so that it may be vertically raised and lowered to any desired height or tilted at a desired angle and any other form of adjustment mechanism may be used to accomplish the desired result.

Each projector is equipped with a neon, or similar projection lamp designated as 20 and 20', having a high degree of intensity and controlled by oscillator units, as shown in Fig. 3. The circuits of these oscillator units include electron tubes 21 and 21', the grids 22 and 22' of which are connected by conductors 23 and 23' to coils 24 and 24', which in turn are connected by conductors 25 and 25' to the negative side of the filament energizing circuit designated by A—. The coils 24 and 24' are bridged by condensers 26 and 26' the opposite plates of which are connected to the conductors 27, 28 and 27', 28' to the conductors 23, 25 and 23', 25' respectively.

The plates of the electron tubes 29 and 29' are connected through conductors 30 and 30' to the coils 31 and 31' which are inductively coupled to coils 24 and 24' respectively, and connected to a terminal of the neon lamps 20 and 20' through conductors 32 and 32'. The other terminal of the lamps 20 and 20' are connected through the conductors 33 and 33' to the positive side of the "B" source of energization designated B+.

The condensers 26 and 26' as shown are of the fixed type and selected to effect predetermined frequencies of oscillation, as for example at 100,000 and 60,000 per second, as previously mentioned.

The analyzer, shown in Fig. 4, consists of the electrical apparatus which analyzes the electrical impulses set up by the photoelectric cell of the scanner and transmits the information, in the form of properly timed electrical impulses to the plotter, as will be described further.

In the operation of the scanner, the projection lamp of each projector will be caused to fluctuate in intensity at a fixed rate or frequency which will be set up and maintained by an oscillator, as described above. The two lamps 20 and 20' will flicker at different frequencies as controlled by the oscillator circuits, shown in Fig. 3. This of course will cause the projections making up the stereoscopic pair to flicker at frequencies corresponding to those of the projection lamps. For the purpose of clarity the rate of fluctuation of the intensities of the two projected images will be referred to as "image frequencies."

In the construction and assembly of this device it will be noted that the photoelectric cell 16 is supplied with an alternating E. M. F. by a modulating transformer 40 (see Fig. 4), this frequency imparted to the cell 16 being lower than the image frequencies. The modulating frequency is analogous to the audio frequency of radio, whereas the image frequencies corresponds to the radio frequency. A fixed condenser 41 is connected across the secondary of the modulating transformer 40 to by-pass the image frequencies.

The immediate circuit of the photoelectric cell 16 includes the conductor 42, secondary coil of the transformer 40, which is bridged by the condenser 41, having leads 43 and 44, conductor 45, coil 46', conductor 47, coil 46 and return lead 49.

Two resonant circuits, each tuned to one of the image frequencies and containing a vacuum tube amplifier-detector 50 and 50' respectively, are inductively coupled to the photoelectric cell circuit.

In these resonant circuits the grids of tubes 50 and 50' are connected by conductors 52 and 52' to the fixed condensers 53 and 53' which are in turn connected to conductors 54 and 54' respectively. The fixed condensers 53 and 53' are bridged by resistances 55 and 55' and the conductors 54 and 54' are connected to coils 56 and 56' which are connected to the negative side of the A source of energization of the filament circuit of tubes 50 and 50', designated A—, by the conductors 57 and 57'. The coils 56 and 56' are bridged by fixed condensers 58 and 58' by the suitable conductors as shown. It is obvious that the current flowing in the plate circuits are equal in frequency, since they have been rectified, and both image frequencies have been modulated by the same modulating frequency. The plate of each tube is connected to one end of the primary winding 60 of a transformer 61, by conductors 51 and 51' respectively and a center tap on the coil 60 is connected through conductor 59 to the positive terminal of the plate supply B+. The two plate circuits thus oppose each other inductively and the E. M. F. induced in the secondary circuit of the transformer 61 will be proportional to the difference in current strength of the two plate circuits.

The secondary winding 62 of transformer 61 is connected to the cathode and grid of a vacuum tube valve 75 in such a way that if any current whatever, regardless of polarity, is flowing in the circuit, a negative potential is impressed upon the grid. This is accomplished by using a bank of four rectifiers 71, 72, 73 and 74 of the heated cathode type.

The bank of rectifiers is connected to the secondary 62 of the transformer 61 through the conductors 63 and 64 which are bridged by a variable resistance 65. The conductor 63 is connected through branch leads 66 and 67 to the cathode of the rectifying tube 71 and the anode of the rectifying tube 72, and the conductor 64 is connected through branch leads 68 and 69 to the cathode of tube 73 and the anode of tube 74. The anodes of tubes 71 and 73 are connected through conductors 76, 77 and 78 to the grid of vacuum tube valve 75. The cathode of tubes 72 and 74 are connected to the negative side of the filament circuit of the vacuum tube 75 through conductors 79 and 80 and to the secondary 81 of the transformer 82 by conductor 83.

The primary 84 of transformer 82 is connected by the conductor 85 to the primary 86 of transformer 40. The leads 87 and 88 connect the primaries 86 and 84 of the transformers 40 and 82 respectively to source of power 89. The plate of the valve 75 is connected to the primary 92 of a transformer 90 by a conductor 91, the other end of the primary 92 being connected to the secondary 81 of transformer 82 by conductor 93.

The plate supply of the valve tube 75 is an alternating current which is equal in frequency, and either in phase or 180 degrees out of phase with the current flowing in the secondary circuit of transformer 61. The frequency will be equal to that of the modulating frequency.

Conductors 94 and 95 connect the secondary 96 of the transformer to amplifier 97 to thus couple inductively the plate circuit of the valve 75 to said amplifier. The amplified impulses are then conducted to the neon, or similar projection lamp 98 of the plotter by conductors 99 and 100.

In the construction of the plotter the neon lamp 98 is located either above or in front of an optical system which comprises a pair of condenser lenses 35 and 35' and a projection lens 37, between which are interposed a pair of scanning discs 36 and 36' which are rotated in synchronism with the scanning discs 13 and 13' of the plotter. The projection lens 37 directs a beam of light from the neon lamp 98 onto a screen 38 which is constructed so that it may be adjustable with respect to its distance from the projection lens 37.

*Operation*

In the operation of the autoplastograph the two pictures are placed in the projectors 10 and 10' of the scanner and then the two projections combined on the screen 12 to form a stereoscopic pair.

The reflected images of the stereoscopic pair are "picked up" by the object lens 15 and then passed through the scanning discs 13 and 13' which allow only the light from one very small dot at a time on the combined images to continue on to the photoelectric cell 16.

Assuming that this point, the light from which is acting on the photoelectric cell is not in focus, the following action will take place:

The intensity of the light projected to the point from the two projectors is unequal. The light acting upon the photoelectric cell sets up stronger electrical impulses corresponding to one image frequency than it does to the other image frequency.

The energy absorbed by the two resonant circuits is unequal in amount, and therefore a current flows in the secondary circuit of transformer 61. In this case, as previously explained, there is no further action since a negative potential is impressed upon the grid of the valve tube 75.

Assuming that the point being scanned is in focus: The intensity of the light projected to the point from the two projectors is equal. The light acting upon the photoelectric cell 16 sets up equally strong impulses corresponding to both image frequencies. Hence, no current flows in the secondary of transformer 61 and no opposing potential is impressed on the grid of the valve tube 75. An interrupted direct current then flows in the plate circuit of the valve 75, which is coupled to an amplifier (of as many stages as necessary). The amplified impulses then are conducted through the projection lamp 98 of the plotter. The set of condensing lenses 35 and 35' concentrates the light from the projection lamp 98 on the projection lens 37 which in turn projects it upon the screen 38 of the plotter. The scanning discs 36 and 36' are interposed between the condensing lenses and the projection lens, as mentioned above.

Only a small amount of light (representing the point being scanned at the time by the scanner) is allowed to reach the screen. This point will correspond in position to the position of the point being scanned on the screen of the scanner, since the scanning discs of the plotter are running in synchronism with those of the scanner. If the image frequencies and the modulating frequency are made high enough it is possible to erect several frames per second, so that a continuous image will be formed on the screen of the plotter. This image will be made up of half-tone lines analogous to closely spaced spot elevations which represent contours. These may either be traced by a draftsman or recorded on photosensitive film or paper.

It is possible to utilize the fundamental principles involved in the device just described by projecting the stereoscopic pair in colors and then placing color-filters in front of the photoelectric cell or cells.

Another scheme would be to project the images in polarized light, each image being polarized at right angles to the other, and then having properly arranged polarizing devices in front of the photoelectric cell or cells, to separate the images.

*Contrast between autoplastograph and television apparatus*

It will be noted from the above description that the principal difficulties encountered in a television machine are not present in the autoplastograph. In the autoplastograph synchronism between the scanning discs of the scanner and the plotter may be accomplished by direct gearing, thus eliminating any possibility of the two sets of scanning discs getting out of synchronism as in the case of electrical transmission by means of synchronous motors as used in television where there is always the possibility of hunting or wobbling of the motors between cycles.

It will also be noted that with the autoplastograph definition and resolution may be only of a degree necessary to define the contours. A halftone will serve the purpose. The dots forming the contour on the screen of the plotter will be analogous to spot elevations taken in topographic surveying with a transit. In television the definition and resolution must be such as to give great detail. This calls for a fine half-tone effect which necessitates a tremendous number of dots for each frame.

With the autoplastograph the number of frames per second in scanning a stationary object may be much less, probably a third or fourth as many as in television. If the contours are to be recorded photographically one frame should be sufficient for each plane of elevation. The number of frames per second in televising a moving object must be in the neighborhood of 20 to 24, to produce the illusion of continuity.

With the autoplastograph connection between the scanner and plotter is accomplished by the use of very short lengths of wire. The impulses need be amplified but once, and since the number of frames per second and the number of dots per frame are comparatively low, the frequency of the impulses are correspondingly low, and easy to handle during amplification.

In television apparatus connection between transmitter and receiver must be maintained either by means of radio waves or considerable lengths of wire. The large number of frames per second, and the tremendous number of dots per frame, necessitate the transmission and reception of extremely high-frequency impulses, and make it difficult to amplify these impulses both during transmission and reception.

*Method of utilizing established horizontal and vertical control and determination of contour interval*

In the construction of the autoplastograph it is proposed to so design the adjustable screen of the scanner that it may be rotated about a vertical axis and also tilted (rotated about a horizontal axis).

Assuming that there are three points of unequal elevation contained in the overlap, or stereoscopic pair, and that the elevation and horizontal position of each point is known: The three points in question determine a plane. The inclination of this plane to the horizontal and also the direction of the line of intersection of the inclined and horizontal planes may be computed. The screen of the scanner may be tilted an amount equal to the angle between the abovementioned inclined plane and the horizontal, then rotated about its vertical axis until the horizontal axis is parallel to the line of intersection of the two planes as located on the projected stereoscopic pair.

Next, the projectors may be adjusted to obtain coincidience of the three points after which the screen is tilted back to the horizontal position and adjusted vertically to obtain coincidence of each of the three points separately. A comparison of the vertical position of the screen for the coincidence of each point and the known elevation of the points will then give the amount which the screen must be adjusted vertically to obtain a given contour interval.

The computations involved will not be difficult and may be done on a special form which will simplify the procedure and reduce the calculations to a mechanical process.

*Scanning discs*

The scanning discs will be made of glass having a low index of refraction and will be covered with an opaque coating except along the spiral lines. This arrangement should be better than an opaque disc with a series of holes bored along the spiral in that the dots formed by the intersection of the spirals of the two discs moving past each other will, in the first case, be continuous and the lines may be made as fine as desired, thus giving much greater detail. It will make it possible to pick up and analyze the light from a much smaller area.

It is proposed to plot the necessary spirals on detail paper or tracing cloth and then photograph them on plates of the proper type of glass coated with photographic emulsion in the usual manner, after which the plates may be developed and cut into the proper shape to be used as scanning discs. This will give a negative—the spirals will be transparent while the remainder of the disc will be opaque. Material other than glass may be used provided it is sufficiently strong and transparent.

It is not proposed to scan the projected stereo images in any greater detail than is necessary to clearly define the contours. As mentioned above, this may be a coarse half-tone. It will be necessary to scan a very small area at any one instant, that is, the point from which the light is admitted to the photoelectric cell through the scanning discs must be extremely fine. However, these points need not be close together. Inasmuch as the projected images may be greatly enlarged, this should not be difficult if scanning discs are made as suggested in my description.

*Miscellaneous*

It is not proposed to reproduce the entire image (or stereo pair) projected on the screen of the scanner) on the screen of the plotter. In fact, nothing will be reproduced—the relative location of the points lying in the plane of elevation corresponding to the position of the screen of the scanner will be indicated on the screen of the plotter.

The main purpose of this scheme, as set forth in my description, is to determine the contours quickly, easily and accurately. Plotting of topographic details, such as roads, streams, buildings, etc., was not considered in the working out of this idea. However, such work can be done upon the screen of the scanner, by temporarily substituting red and green lights for the neon lights (used in the two projectors of the scanner for determining planes of elevation) and using red and green colored glasses to determine the correct focus.

The difference in horizontal scale due to difference in ground elevation may be compensated for by moving the screen of the plotter an equivalent distance in the same direction that the screen of the scanner is moved when going from one contour to another. This eliminates one of the most serious drawbacks inherent in existing stereoscopic plotting devices.

It should be borne in mind that the enclosed drawing is in no sense a working drawing, but is intended merely to show the principles of operation of the device. For instance, a particular type of oscillator is shown in connection with the neon, or similar, projection lamps. This is meant to represent simply "an oscillator." A number of different types may be used for this purpose with equal success.

Having described my invention what I claim as new and wish to secure by Letters Patent is:

1. A device for outlining contours at various elevations from stereoscopic photographs comprising in combination a scanner, an analyzer, and a plotter, the scanner including means for coincidently and simultaneously projecting images of a pair of stereoscopic photographs at predetermined image frequencies upon an adjustable scanner screen, and projecting and scanning means adapted to project beams reflected from corresponding points on said images upon a photoelectric cell, the analyzer including a circuit for said photoelectric cell inductively coupled to an energizing circuit, resonant circuits including electron tubes tuned to said image frequencies and inductively coupled to said photoelectric cell circuit, a rectifier circuit including a bank of rectifiers and an electronic valve coupled inductively to said resonant circuits and said energizing circuit and an amplifier coupled inductively to said rectifier and said energizing circuit, and the plotter including a projector having a lamp operatively connected to said amplifier, scanning means operating in synchronism with the scanning means of said scanner and an adjustable plotting screen, said plotter being adapted to project a beam upon said plotting screen defining a contour at a predetermined elevation, dependent on the adjustment of said scanner screen, when the intensities of the points reflected upon said photoelectric cell of the scanner are equal.

2. A device for outlining contours at various elevations from stereoscopic photographs comprising in combination a scanner, an analyzer, and a plotter, the scanner including means for coincidently and simultaneously projecting images of a pair of stereoscopic photographs at predetermined image frequencies upon an adjustable scanner screen, and projecting and scanning means adapted to project beams reflected from corresponding points on said images upon a photoelectric cell, the analyzer including a circuit for said photoelectric cell inductively coupled to an energizing circuit, resonant circuits including electron tubes tuned to said image frequencies and inductively coupled to said photoelectric cell circuit, a rectifier circuit including a bank of rectifiers and an electronic valve coupled inductively to said resonant circuits and said energizing circuit and an amplifier coupled inductively to said rectifier and said energizing circuit, and the plotter including a projector having a lamp operatively connected to said amplifier, scanning means operating in synchronism with the scanning means of said scanner and an adjustable plotting screen, said plotter being adapted to project a beam upon said plotting screen defining a contour at a predetermined elevation and of equal magnitude as represented on the coincident images dependent on the adjustment of the scanner and plotter screens, when the intensities of the points reflected upon said photoelectric cell are equal.

3. A device for outlining contours at predetermined elevations from stereoscopic photographs comprising, a scanner including means for projecting said photographs at different image frequencies, means for scanning corresponding points on the projected images of said photographs, an analyzer including means for selecting scanned points of equal photographic density, and a plotter including means for projecting upon a screen light points corresponding in location to said points of equal density to thereby effect representations of said contours.

4. A device for outlining contours at predetermined elevations from stereoscopic photographs comprising, a scanner including means for projecting said photographs at different image frequencies, adjusting means in connection with said projection means for determining the relative elevation of said contours, means for scanning corresponding points on the projected images of said photographs, an analyzer including means for selecting scanned points of equal photographic density, and a plotter including means for projecting upon a screen light points corresponding in location to said points of equal density to thereby effect representations of said contours.

5. A device for outlining contours at predetermined elevations from stereoscopic photographs comprising, a scanner including means for projecting said photographs at different image frequencies, means for scanning corresponding points on the projected images of said photograhs, an analyzer including means for selecting scanned points of equal photographic density, and a plotter including scanning means operated in synchronism with said first mentioned scanning means for projecting upon a screen light points corresponding in location to said points of equal density to thereby effect representations of said contours.

6. A device for outlining contours at predetermined elevations from stereoscopic photographs comprising, a scanner including means for projecting said photographs at different image frequencies, means including scanning discs for electromechanically selecting corresponding points on said photographs, an analyzer including means for selecting scanned points of equal photographic density, and a plotter including remotely removed means electrically connected with said analyzing means, and scanning discs in synchronism with said first mentioned discs, for projecting upon a screen light points corresponding in location to said photographic points of equal density to thereby effect representations of said contours.

7. A method for outlining contours at predetermined elevations from a pair of stereoscopic photographs comprising, simultaneously and coincidently projecting images of said photographs at different image frequencies, scanning the projected images of said photographs to determine points of equal density, and electrically controlling the projection of a scanning beam to project contours outlining a succession of points of equal density to define an elevation.

8. A method for outlining contours at predetermined elevations from stereoscopic photographs comprising the following steps; simultaneously and coincidently projecting said photographs at different image frequencies, scanning the projected images of said photographs, electrically analyzing corresponding points on said images to determine points of equal density and outlining a contour corresponding to said points of equal density scanned on said images.

HARRY B. PORTER.